UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

VARNISH-REMOVING COMPOSITION.

1,229,247.  Specification of Letters Patent.  Patented June 12, 1917.

No Drawing.  Application filed March 21, 1917. Serial No. 156,390.

*To all whom it may concern:*

Be it known that I, CARLETON ELLIS, a citizen of the United States, residing at Montclair, in the county of Essex, State of New Jersey, have invented certain new and useful Improvements in Varnish-Removing Compositions, of which the following is a specification.

This invention relates to a paint and varnish remover composition capable of being prepared from cheap materials and having certain properties adapting it for use, particularly in the removal of varnish coatings or coatings containing a varnish composition with which is incorporated a pigment.

It has heretofore been proposed to use as paint and varnish removers compositions consisting of a wax solvent, a wax precipitant and a wax, including as a wax solvent benzol and its homologues, as a wax precipitant various alcoholic bodies and ketones, and various waxes, particularly paraffin or ceresin wax. The present invention contemplates the use of solvents of waxes of this character but is specially concerned with specific solvents of a character adapted for specific purposes.

The invention involves as a wax solvent a complex hydrocarbon mixture known as solvent-naphtha, and particularly the lighter species of solvent-naphtha incorporated with grain alcohol or denatured alcohol and a waxy body. Such a composition without further additions is not of an entirely satisfactory character under all climatic conditions as the waxy material in cold weather tends to separate to a very considerable extent and when the solution is thereafter applied unless it has had the opportunity to digest in a warm place for a considerable period, does not contain in solution or suspension a sufficient amount of wax to satisfactorily effect the formation of a retarding film to reduce or minimize the evaporation of the solvents. This is particularly true when the percentage of alcohol is fairly high, say amounting to forty or fifty per cent. of the total solvent employed. With these specific solvents the wax has a tendency to deposit even when not exposed to extremely low temperatures. To overcome this difficulty I have found the addition of a small amount of carbon bisulfid suffices. A proportion of ten per cent. or so of the total solvent mixture may consist of carbon-bisulfid although the amount may be varied within considerable limits according to the character of the solvent-naphtha employed or other conditions. It is important for best results to have the denatured alcohol as free as possible from water. When alcohol of less than 90% strength is employed, it does not blend satisfactorily except in certain very limited proportions and even though the remover composition is made with these proportions on exposure when applied to the paint or varnish some evaporation may take place especially usually before a complete film is formed, and also absorption of one or more of the constituents of the remover by the paint or varnish coating may occur resulting in an upset of the balanced proportions and causing a separation of the alcohol amounting to a degree of immiscibility which does not tend to satisfactory removing qualities. In order to get the best penetrating and loosening effect due to the presence of the solvent-naphtha and the alcohol respectively, it is important to have the solvent material substantially miscible so that they may coöperate in the mingled state to penetrate and loosen the varnish coating. The presence of the carbon-bisulfid by its action on the wax on which it acts as a powerful solvent, prevents the latter from clogging the solution to such an extent that the penetrating action of the solvent action is reduced or lost entirely. Consequently the carbon-bisulfid has several important functions in the removing composition. Too large a quantity preferably should not be added because the carbon-bisulfid is of a highly inflammable nature and when present to the extent of much more than ten per cent., the action of the solvent-naphtha therein is largely lost. With a preponderating amount of solvent naphtha the inflammability of the carbon-bisulfid is sufficiently repressed so that the composition is safe to be used under the usual precautions taken with volatile solvents.

– While the mixture of solvent-naphtha and denatured alcohol will carry in solution only a very small percentage of wax, on the addition of ten per cent. of carbon-bisulfid four or five per cent. of a wax such as paraffin wax may be held in solution even at moderate temperatures. An illustrative formula satisfactory for the purposes hereof is the following:

50 parts by volume of solvent-naphtha.

40 parts of denatured alcohol of at least 95% strength, and preferably in excess of 95% strength.

10 per cent. of carbon-bisulfid.

The foregoing forms the composite solvent mixture. With this liquid composition 5 or 6% paraffin may be suitably incorporated in any desired manner.

The proportions of the solvent-naphtha to the denatured alcohol may be varied more or less as desired. An excess of alcohol gives better results on shellac and in such cases the wax is precipitated by the use of more carbon-bisulfid, usually only a very small percentage addition sufficing. Thus the composition may be prepared so as to secure a balance or equilibrium depending upon the proportions of the solvents and their action on the wax. A sufficient amount of wax should be employed to secure the proper retardation of evaporation and if required to give a consistent composition and the adjustment of the proportion of carbon-bisulfid with reference to these conditions and to the character of the paint or varnish to be removed may be made by varying the foregoing rules.

What I claim is:

1. A paint and varnish remover comprising a composite mixture of solvent hydrocarbons of coal tar consisting mainly of solvent naphtha incorporated with a wax precipitant consisting mainly of an alcoholic body and having a waxy retarder of evaporation held in film-forming condition by the presence of carbon bisulfid.

2. A paint and varnish remover comprising a composite mixture of solvent hydrocarbons of coal tar consisting mainly of solvent naphtha, having a relatively low solvent action on waxy material, a wax precipitant consisting mainly of an alcoholic body miscible with said solvent naphtha, a relatively small quantity of carbon bisulfid, and a waxy retarder of evaporation held in film-forming condition by the presence of carbon-bisulfid.

3. A paint and varnish remover comprising a hydrocarbon of coal tar, having substantially less solvent action on wax than benzol, incorporated with denatured alcohol, carbon bisulfid and paraffin wax, the proportion of said carbon-bisulfid being adjusted with respect to the amount of paraffin wax, whereby the latter is maintained in a satisfactory film-forming condition.

CARLETON ELLIS.